United States Patent [19]
Cario et al.

[11] Patent Number: 5,395,197
[45] Date of Patent: Mar. 7, 1995

[54] NAIL WITH NON-CIRCULAR HEAD

[76] Inventors: Antonio Cario, 27 Huntingwood Court, Woodbridge, Ontario, Canada, L4H 1A6; Vittorio Iannucci, 9 Four Winds Drive, Toronto, Ontario, Canada, M3J 2S8; Eberhard F. Leistner, 73 Dorset Road, Scarborough, Ontario, Canada, M1M 2S8

[21] Appl. No.: 202,016

[22] Filed: Feb. 25, 1994

[51] Int. Cl.⁶ .................. F16B 15/08; B65D 85/24
[52] U.S. Cl. ............................ 411/442; 411/923; 206/345
[58] Field of Search ........... 411/442, 443, 486, 439, 411/923; 206/343, 344, 345

[56] References Cited

U.S. PATENT DOCUMENTS

| | | |
|---|---|---|
| 2,909,781 | 10/1959 | Ollig et al. . |
| 2,940,081 | 6/1960 | Juilfs . |
| 3,031,670 | 5/1962 | Sillars . |
| 3,082,425 | 3/1963 | Leslie . |
| 3,152,334 | 10/1964 | Lingle .................. 411/923 X |
| 3,835,991 | 9/1974 | Brecht .................. 411/442 X |
| 3,861,526 | 1/1975 | Leistner ............... 411/442 X |
| 3,935,945 | 2/1976 | Smith et al. .......... 411/442 X |
| 4,250,996 | 2/1981 | Bartz ..................... 206/343 |
| 5,056,976 | 10/1991 | Sygnator et al. . |
| 5,060,797 | 10/1991 | Sygnator ............... 411/442 X |
| 5,154,670 | 10/1992 | Sygnator et al. . |

FOREIGN PATENT DOCUMENTS 1041857 9/1966 United Kingdom .

Primary Examiner—Neill R. Wilson

[57] ABSTRACT

A nail for use in a nailing strip, having a non-circular head defined by at least two dissimilar convex curved shapes, the nail having; a nail shank with a point at one end, shank; a first nail head portion at the other end of the shank, lying substantially in alignment with the shank axis, and extending outwardly therefrom on either side of the shank, a second nail head portion formed integrally with the first nail head portion, the second nail head portion being substantially offset relative to the shank, the first nail head portion defining a first generally convex curved shape, and having a central point coincident with an edge of the shank, so that the nails may lie in closely collated relation in a strip, and, the second nail head portion defining a generally convex curved shape extending away from the shank.

6 Claims, 2 Drawing Sheets

NAIL WITH NON-CIRCULAR HEAD

FIELD OF THE INVENTION

The invention relates to nails adapted to be formed into a strip of nails, for use in a power operated nailing applicator, and in particular, to such nails having nail heads which are asymmetric about their transverse axis and define in plan, first and second convex arcuate edges, which together define a non--circular shape.

BACKGROUND OF THE INVENTION

Nails used in power operated nailing applicators are preferably formed into strips, being joined together by for example glue, adhesive stripping, or in some cases wires have been welded to the shanks. It is desirable that the strips shall have a predetermined length suitable for the nailing applicator. At the same time, it is desirable that the strip shall contain as many nails as possible within that given length. This will reduce the down-time involved when reloading the nailing applicator magazine with a new strip of nails.

For this purpose, the nails in the strip are arranged with the nail heads overlapping one another. The nails are offset with their heads one above the other, so that the axis of the strip is more or less diagonal to the axis of the nail shanks. With a strip formed of conventional round headed nails having circular heads with the head centre coaxial with the nail shank, the edge of the head of one nail will interfere with the shank of the next adjacent nail, causing the nails in the strip to be spaced apart. This spacing increases the difficulty of joining the nails together into the strip. In addition however it reduces the number of nails which can be accommodated in a strip of a predetermined length.

It is, however, desirable to maximize the number of nails which can be accommodated in a strip of a given length. This will mean that the magazine of the nailing applicator, which usually will accept a strip only of a certain predetermined length, will carry a greater number of nails. This in turn will reduce the down time of the nailing applicator, since it can be operated for a longer period of time, without the magazine requiring a refill.

For this reason, in the past nails have been made with "heads" which are shaped in plan more or less in the shape of the letter D. In this way, the nail shanks could lie against one another, with the heads overlapping one another, but without interfering with the shanks. This solution appears to satisfy the objective of maximizing the number of nails in a given length of strip. The total area of the nail head is somewhat reduced, as compared with a circular headed nail. This is sometimes perceived to reduce the ability of the nail head to resist penetration into a workpiece, such as a piece of wood. This problem is reduced if care is taken to ovient the nail head across the grain of the wood. If the nails are incorrectly positioned there may be a tendency for the applicator to drive the nail too far into the work piece. In addition, there may be a tendency for the nail head to pull through one of the wooden work pieces.

To alleviate this problem, it is proposed, in U.S. Pat. No. 5,056,976 H. Sygnator et. al., dated Oct. 15, 1991, to provide a nail with a circular head, with the centre of the circular head offset relative to the axis of the nail shank, so that the periphery of the circle of the head, at one point, coincides with the periphery of the nail shank. In this way, it is proposed, that the nails can be closely collated into a nailing strip, with their shanks in virtually edge abutting relation and with their heads overlapping, and at the same time there is no loss in the holding power of the head itself. There are however various practical difficulties with this proposal. Since the centre of the circular nail head is substantially offset from the axis of the shank, there is a tendency for such nails to cause difficulties when used in a standard power operated nailing applicator. The problem lies in part in the design and manufacture of the standard nailing applicators. The nailing driver, reciprocates in a guide, and the nail is held in the guide until the driver hits the nail head. However, the holding of the nail in the guide is achieved by the junction means joining the nails and forming then into a strip. Since the nail head is circular, and is substantially offset from the nail shank, the nail head projects across the guide but with the shank offset to one side. As a result, the nail shank will lie close to side wall of the guide, and in fact the head, and shank may cause excessive wear to the guide, or may cause the nail to be damaged when it is driven in, since the shank is offset away from the axis the driver itself.

There are also practical problems in manufacturing circular nail heads which are so substantially offset from the axis of the shank from which the nail head is formed. In spite of the shortcomings of this proposal however, it is still clearly desirable to maximize the area of the nail head in this type of nail, provided that this can be done both without reducing the number of nails which can be formed into a strip of a given length, and also which can be done without interfering with the operation of the power operated nailing applicator.

BRIEF SUMMARY OF THE INVENTION

With a view therefor to providing a nail for use in a nailing strip which satisfies the foregoing advantages, without introducing additional disadvantages the invention comprises, a nail for use in a nailing strip, said nail having a non-circular head defined by at least two dissimilar convex arcs, said nail comprising a nail shank defining a predetermined central axis, and having a point at one end of said shank, a first nail head portion at the other end of said shank, lying substantially in alignment with said shank axis, and extending outwardly therefrom on either side of said shank, a second nail head portion formed integrally with said first nail head portion, said second nail head portion being substantially offset relative to said shank, and, said first nail head portion defining a first generally convex arcuate shape, extending equally on either side of said shank, and defining a central point coincident with an edge of said shank, whereby said nails may lie in closely collated relation in a said strip, and said second nail head portion defining a generally convex arcuate shape extending away from said shank, said first and second nail head portions defining between them a transverse axis, transverse to the axis of said strip, and a further defining longitudinal axis, coincident with the longitudinal axis of said strip, and wherein said nail head dimension along said transverse axis is greater than said nail head dimension along said longitudinal axis.

A further feature of the invention provides that said first nail head portion is defined by first and second arcs, meeting at a point coincident with said longitudinal axis of said nail head, and wherein said second nail portion is defined by a single continuous arc.

A further feature of the invention provides that said first and second arcs of said first nail head portion are defined by radii, having centres offset from one another on either side of said longitudinal axis of said nail head.

A further feature of the invention provides that said first nail head portion is defined by a first continuous arc, having a radius R1, and wherein said second nail head portion is defined by a second continuous arc having a radius R2, wherein R2 is greater than R1, and wherein the centre of R1 is located at a predetermined location along the longitudinal axis of said nail head, and wherein the centre of radius R2 is located at a second predetermined point along said longitudinal axis of said nail head, and wherein said centre of radius R1 is located on one side of a transverse axis of said nail head, and wherein said radius R2 is located on the opposite side of said transverse axis.

A further feature of the invention provides that said arcs of said first and second nail head portions do not meet one another on opposite sides of said nail head, but merge through partially non-arcuate portions.

A further feature of the invention provides that said arc of said first nail head portions and said arc of said second nail head portion meet one another at generally rounded points, transversely of said nail head.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
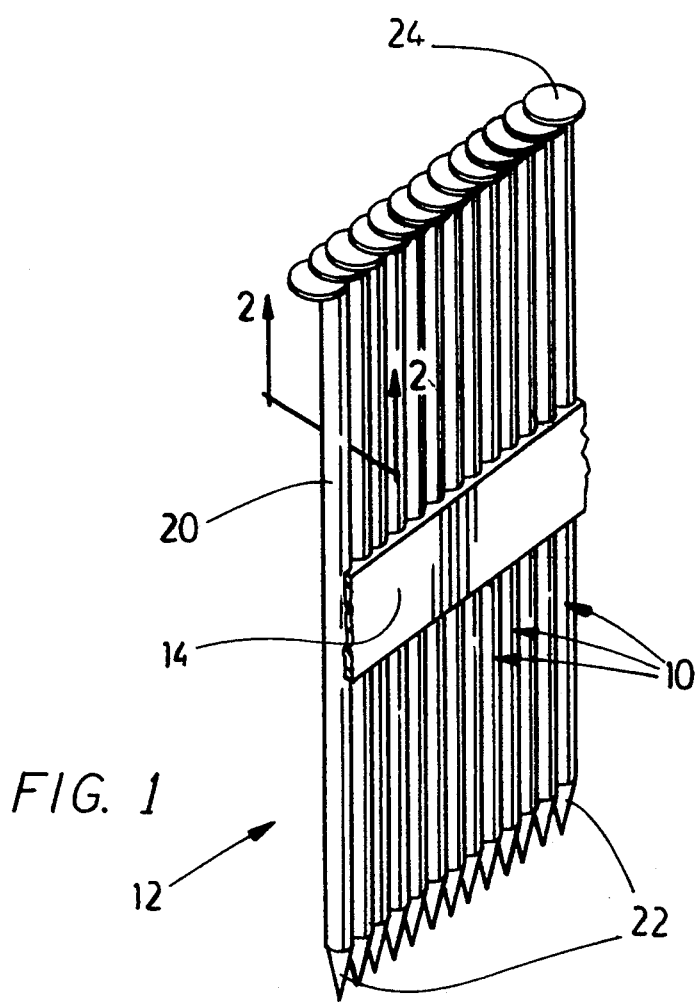
FIG. 1 is a perspective view of a nailing strip incorporating nails in accordance with the invention.

Referring first of all to FIG. 1., the invention will be seen to relate as described above, to nails 10 which are adapted to be formed into a nailing strip indicated generally as 12. In the strip it will be seen that the nail shanks lie close to one another with the nail heads overlapping one another. In the prior art, such nails in such a nailing strip had the well known D-shaped head, in which there was an arcuate edge and a straight edge with the straight edge being coincident with the edge of the nail shank.

The longitudinal axis of the strip 12 is generally diagonal to the axes of the nails themselves. Nailing applicators are manufactured having magazines and feed mechanisms adapted to receive nails in the form of such a strip with a diagonal axis.

As is well known, such nailing applicators have drivers which reciprocate in a nail guide. The endmost nail in the strip is adapted to be received in the guide, and the driver will separate the end most nail from the strip and drive it downwardly through the guide into a work piece. This is well known in the art, and is explained here merely for the sake of background.

The nailing strip 12 comprise a plurality of nails 10, held together by any suitable medium. This may be an adhesive material 14, formed in a strip or strips, bonded to the side of the nail. Other forms of medium include strips of adhesive tape, hot melt adhesive (not shown) and even thin wires (not shown), welded to the nails. As is well known, it is desirable to collate the nails as closely as possible together to one another in the strip, so that a given length of strip contains a maximum number of nails. This enables the nailing applicator to be used over longer periods of time, before requiring the strip to be replaced.

Figure 2:
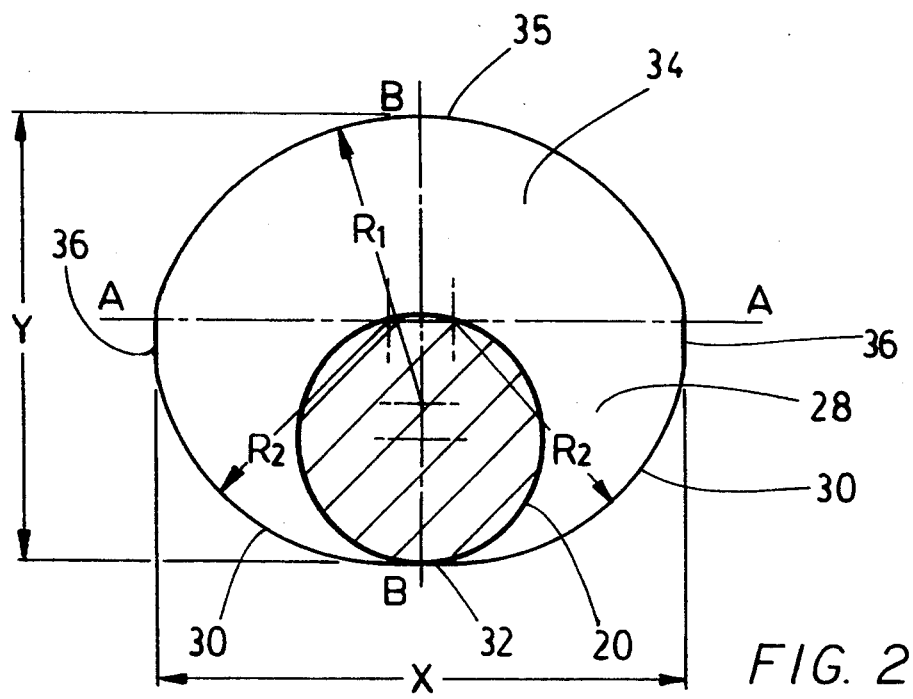
FIG. 2 is a top plan view of a nail in accordance with a first embodiment of the invention.
Figure 3:
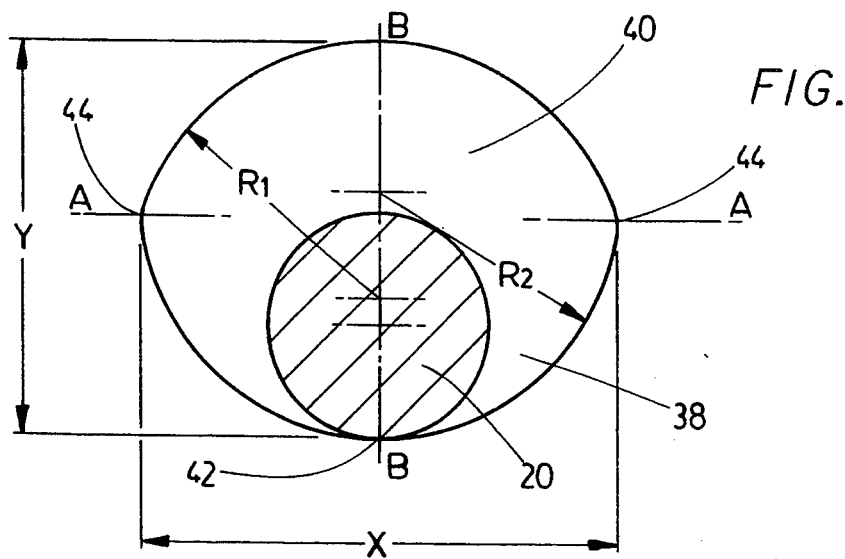
FIG. 3 is a top plan view of a nail in accordance with the second embodiment of the invention.

The nail 10 in accordance with the invention is shown detail in FIGS. 2 and 3. It will be seen to comprise a shank 20 having a point 22 at one end and a head 24 at the other end. The shanks 20 may be in some cases formed with flat surface portions (not shown) lying in parallel planes along either side, to facilitate handling and collating of the nails in the nail strip forming apparatus (not shown), so as to ensure that all nails in the strip are rotated into the correct rotational position.

The head 24, when viewed in bottom plan, will be seen to comprise a generally asymmetric oval shape. An axis A—A transverse to the nail head will be seen to divide the nail head into two asymmetrically shaped portions. The first portion 28 defines arcuate side edges 30—30, and is located substantially directly over the nail shank, with the centre 32 of its edge being substantially coincident with the edge of the nail shank.

The other nail head portion 34 defines a generally arcuate edge 35 having a radius which is substantially longer than the radius of the side portions 30 of the nail head. The two arcuate side portions 30—30 and arcuate nail head portion 34 meet one another at curved junctions 36—36. The arcs of the two nail head portions are so arranged and dimensioned, that the area included between them is substantially equivalent to the area of a typical circular head of a typical conventional nail of the same length and thickness, thus maximizing the holding power of the nail in a work piece. As will be seen, a major portion of the area of the nail head is offset relative to the axis of the shank of the nail. This feature enables the nails to be collated into the strip 12 (FIG. 1) with the head portions 34 overlapping the head portions 28, and the shanks 20 substantially in contact with one another.

When the nail head is viewed in plan, the axis A—A (FIG. 2) is transverse to the axis of the strip 10 (FIG. 1) and defines an imaginary line of separation between the first nail head portion 28, and head portion 34. It will be seen that the nail head, when viewed along the axis A—A is asymmetrical.

Also as viewed in plan, the nail head is wider along the axis A—A than it is along the longitudinal axis B—B of the nail head.

The periphery or shape of the second nail head portion 34, in this embodiment of the invention, will be seen to be generated by a first arc having a radius r1, and having a centre offset along the longitudinal axis B of the nail in the leading direction of the nail head, the term leading direction having reference to the orientation of the nail head when collated and formed into a strip of nails. The first head portion 28 will be seen to be generated by arcs having radii r2—r2. The radii r2 have centres spaced apart from one another. In this example their centres are located along the transverse axis A—A of the nail head, but in other cases the centres could be located elsewhere.

The illustrations of the nail heads of the various embodiments are of course considerably enlarged.

In the embodiment of FIG. 3, the nail shank is represented as 20, as before. However, the nail head comprises a first nail head portion 38, and a second nail head portion 40. In this embodiment, the first nail head portion 38 is defined by a continuous arc, having a radius r2. The centre of the radius r2 is located along the longitudinal axis B—B, just outside the periphery of the nail shank 20.

The second nail head portion 40 is defined by a radius r1, having a centre also located along the axis B—B, but located between the periphery of the shank 20, and its centre.

The radius r1 is somewhat longer than the radius r2. The centre of the arc of the nail head portion 38, located at 42, is coincident with the periphery of shank 20. The arcs of the nail head portions 38 and 40 meet at points 44—44 located along the axis A—A transverse to the nail head.

As in the FIG. 2 embodiment, the distance along the transverse axis is greater than the distance along the longitudinal axis B—B.

Figure 4:
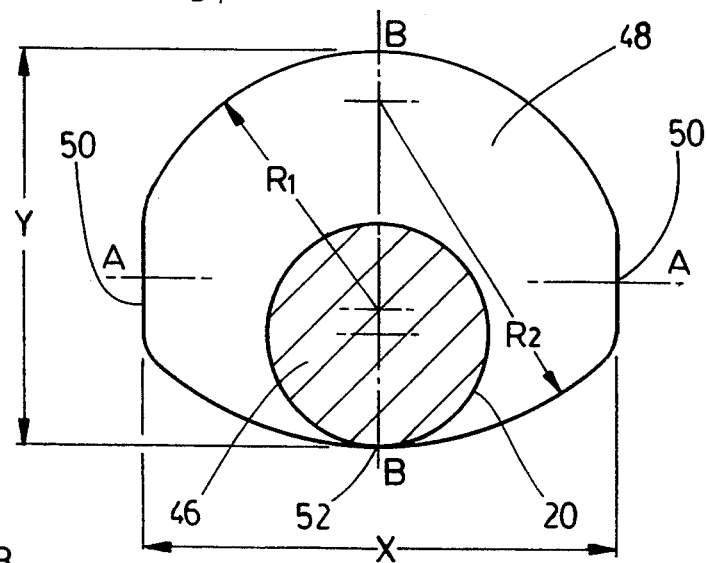
FIG. 4 is a top plan view of a nail in accordance with the third embodiment of the invention, and, FIG. 5 is a top plan view of a nail in accordance with a fourth embodiment of the invention.

In the embodiment of FIG. 4, 20 again represents the shank of the nail. In this case the first nail head portion 46 is located over the shank 20, and extends on either side thereof, and a second nail head portion 48 is located offset from the nail shank 20. The first nail head portion 46 is defined by a radius r2, having a centre located along the longitudinal axis B—B and located substantially forwardly of the periphery of the nail shank 20. The nail head portion 48, is defined by a radius r1 which is located on the axis B—B, within the periphery 20 of the nail shank 20, and close to its central axis.

The arcs defined by the radius r2 and r1 do not meet, but terminate at side edge portions 50—50.

In this embodiment, it will be noted that the radius r2 is longer than the radius r1. However, the distance defined along the transverse axis is still greater than the distance defined along the longitudinal axis B—B.

As in the embodiment of FIGS. 2 and 3, the arc defined by the radius r2, at its centre point 52, coincides with the edge of the nail shank 20.

Figure 5:
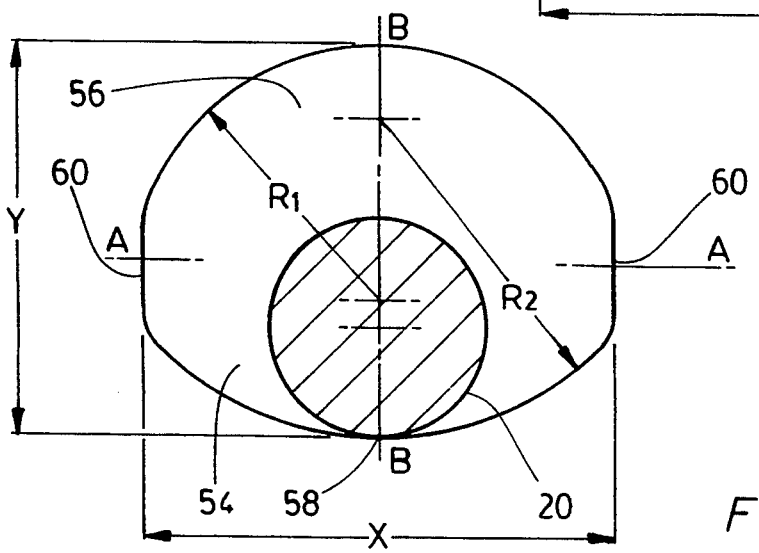

In the embodiment of FIG. 5, the nail shank is again indicated generally as 20. The first nail head portion 54 is located substantially over the shank 20, and extending on either side thereof. A second nail head portion 56 extends forwardly of the nail shank 20. The first nail head portion 54 is defined by the radius r1, having its centre located along the axis B—B, and spaced a distance forwardly of the periphery of the nail shank 20.

The second nail head portion 56 is defined by the radius r2 and having its centre located within the periphery of the nail shank 20, but forwardly of the shank centre.

The radius r2 defines an arc which coincides at its centre point 58, with the periphery of the nail shank 20.

The arcs defined by the two radii r1 and r2 do not meet, but terminate at edge portions 60—60.

As in the previous embodiments, the distance along the transverse axis is still greater than the distance along the longitudinal axis.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A nail for use in a nailing strip, said nail having a non-circular head defined by at least two dissimilar convex curved shapes, said nail comprising;
    a nail shank defining a predetermined central axis, and having a point at one end of said shank;
    a first nail head portion at the other end of said shank, lying substantially in alignment with said shank axis, and extending outwardly therefrom on either side of said shank;
    a second nail head portion formed integrally with said first nail head portion, said second nail head portion being substantially offset relative to said shank;
    said first nail head portion defining a first generally convex curved shape, extending equally on either side of said shank, and defining a central point coincident with an edge of said shank, whereby said nails may lie in closely collated relation in a said strip, and,
    said second nail head portion defining a generally convex curved shape extending away from said shank, said first and second nail head portions defining between them a transverse axis, transverse to the axis of said strip, and a further defining longitudinal axis, coincident with the longitudinal axis of said strip, and wherein said nail head dimension along said transverse axis is greater than said nail head dimension along said longitudinal axis.

2. A nail for use in a nailing strip as claimed in claim 1 and wherein said first nail head portion is defined by first and second arcs, meeting at a point coincident with said longitudunal axis of said nail head, and wherein said second nail portion is defined by a single continous arc.

3. A nail as for use in a nailing strip as claimed in claim 2 wherein said first and second arcs of said first nail head portion are defined by radii, having centres offset from one another on either side of said longitudinal axis of said nail head.

4. A nail for use of nailing strip as claimed in claim 1 wherein said first nail head portion is defined by a first continous arc, having a radius R1, and wherein said second nail head portion is defined by a second continous arc having a radius R2, wherein R2 is greater than R1, and wherein the centre of R1 is located at a predetermined location along the longitudinal axis of said nail head, and wherein the centre of raduis R2 is located at a second predetermined point along said longitudinal axis of said nail head, and wherein said centre of raduis R1 is located on one side of a transverse axis of said nail head, and wherein said radius R2 is located on the oppositie side of said transverse axis.

5. A nail head for use of a nailing strip as claimed in claim 4, and wherein said arcs of said first and second nail head portions do not meet one another on opposite sides of said nail head but merge through partially non-arcuate portions.

6. A nail head for use of a nailing strip as claimed in claim 5 wherein said arc of said first nail head portions and said arc of said second nail head portion meet one another at generally rounded points, transversely of said nail head.

* * * * *